Figure 4:
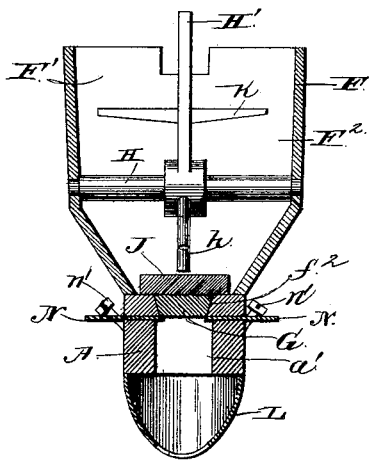

(No Model.) 2 Sheets—Sheet 1.
W. C. McTYEIRE.
CULTIVATOR AND PLANTER.
No. 407,029. Patented July 16, 1889.
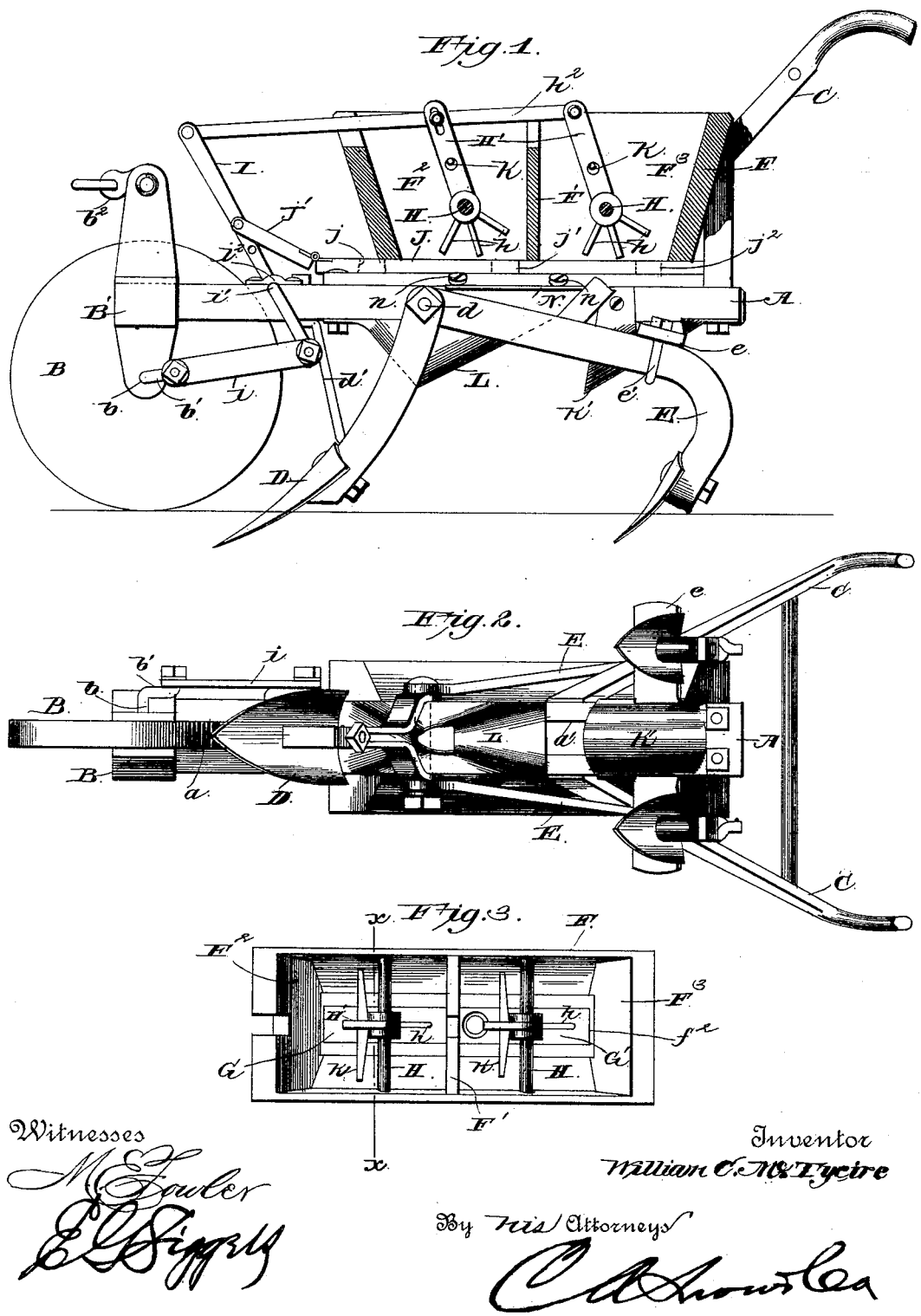

(No Model.) 2 Sheets—Sheet 2.

W. C. McTYEIRE.
CULTIVATOR AND PLANTER.

No. 407,029. Patented July 16, 1889.

Witnesses
M. Fowler

Inventor
William C. McTyeire
By his Attorneys

UNITED STATES PATENT OFFICE.

WILLIAM CAPERS McTYEIRE, OF HATCHECHUBBEE, ALABAMA.

CULTIVATOR AND PLANTER.

SPECIFICATION forming part of Letters Patent No. 407,029, dated July 16, 1889.

Application filed June 14, 1888. Serial No. 277,080. (No model.)

*To all whom it may concern:*

Be it known that I, WILLIAM CAPERS MCTYEIRE, a citizen of the United States, residing at Hatchechubbee, in the county of Russell and State of Alabama, have invented a new and useful Improvement in Combined Cultivator and Planter, of which the following is a specification.

This invention relates to a combined cultivator and planter, and has for its object the provision of an agricultural implement which can be used for sowing all kinds of seed and fertilizers, singly or combined, and which can be readily converted into a cultivator for tilling the soil.

The planter is so constructed that the seed-hoppers and the seed-slide-operating devices, as well as the grain spouts or chutes, can be readily detached when it is desired to use the device for the sole purpose of cultivating, thereby rendering it easy to manipulate, as it is divested of all superfluous devices. The covering-shovels are detachable, and are adapted to be replaced by spring-hangers, which support a coverer or drag-bar.

The improvement consists in the general construction of the implement, whereby it is readily accessible to all its parts for cleaning and repairing, and whereby it can be adapted to plant the various kinds of seeds and in any given quantity.

The improvement further consists in the peculiar construction and combination of the parts which hereinafter will be more fully described and claimed, and shown in the drawings, in which—

Figure 5:
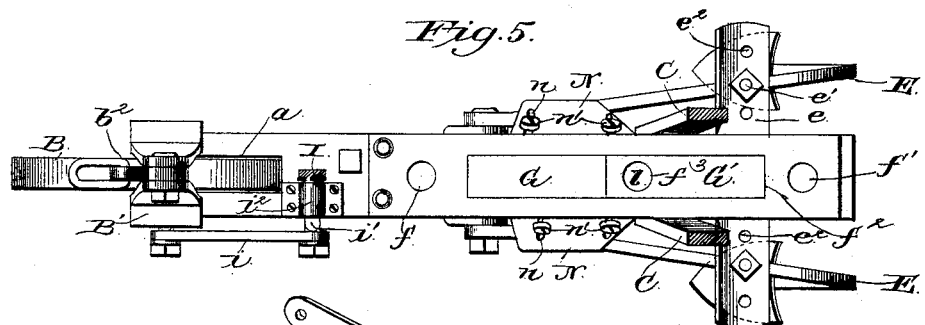
Figure 6:
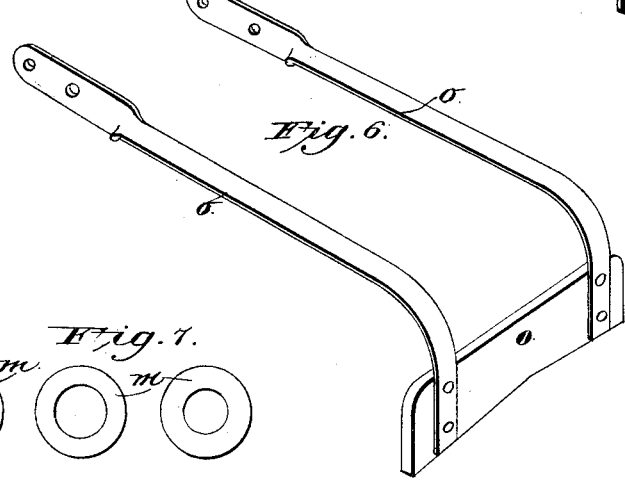
Figure 7:

Figure 1 is a side view, parts being broken away, of a planter embodying my invention. Fig. 2 is a bottom plan view of the planter. Fig. 3 is a top plan view of the double hopper. Fig. 4 is a cross-section of the hopper on line $x\,x$ of Fig. 3. Fig. 5 is a top plan view of the planter, showing the hopper and the seed-slide removed. Fig. 6 is a perspective view of the coverer and the spring supporting bars. Figs. 7 are plan views of a number of reducing-rings having different-sized openings, which are adapted to be fitted in the openings in the seed-slide to regulate the amount of seed to be planted.

The longitudinal beam A, having the opening $a$ in its front end and the slot $a'$ near its rear end, supports the planting and cultivating devices and has the handles C applied thereto. The pilot or drive wheel B is journaled between the lower ends of the vertical bracket B' on the shaft $b$, which has one end provided with the crank $b'$. The upper ends of the bracket are brought together and have the clevis $b^2$ secured between them. The wheel extends into the opening $a$, and is braced laterally by the portions of the beam on each side thereof in the event of abnormal lateral strain coming on the said wheel.

The opening-plow D and the covering-shovels E are secured at their upper ends to the sides of the beam by the one bolt $d$, the brace $d'$ strengthening the plow D and the cross-bar $e$, and clips $e'$ supporting the rear ends of the coverers. The ends of the cross-bar have a series of openings $e^2$, through any one of which the clips pass to adjustably connect the coverers with the said cross-bar, whereby the coverers at their rear ends can be separated and brought closer together to bring the covering-shovels at a greater or less distance apart.

The hopper F is of the usual form, having slanting sides and end walls. The bottom of the hopper is extended at each end and is provided with the end openings $f$ and $f'$, which are located wholly without the hopper, and with the slot $f^2$ between the openings $f$ and $f'$, which extend from one end to the other of the hopper, the edges of the slot being beveled to support the removable blocks G and G', that fill the said slot $f^2$. The block G' has an opening $f^3$ for the discharge of the grain or the fertilizer. The hopper is divided by the central partition F' into two compartments F² and F³, forming practically a double hopper. Each hopper is provided with an agitator-shaft H, which is journaled at its ends in the side walls of the hopper, and is provided with the vertical lever H', having agitating-fingers $h$ at its lower end and the agitator-bar K above the shaft. The levers H' extend above the hopper and are adapted to be connected to the bar $h^2$, arranged above the hopper and connected at its forward end to the lever I, which is connected at its lower end to crank $b'$ by the pitman $i$. The lever I is provided with an offset $i'$ near its lower end, which rests on the beam A, and is held in place by the box $i^2$, fitted over the said offset and forming a bearing for the said lever.

The seed-slide J, having openings $j, j'$, and $j^2$, corresponding with the middle and the end openings of the bottom, rests on the said bottom of the hopper, and is adapted to work through openings in the end walls of the hopper, and is connected with the said lever I by the pitman J'.

The rear grain-chute K' is open at its front side and is located directly below the rear opening $f'$. The chute L is double and is adapted to receive the contents from the openings $f$ and $f^3$. It will be observed that the discharge-opening $f^3$ is in the rear compartment of the hopper and that under ordinary circumstances it is closed by the block $l$, as when fertilizer is placed in the front hopper and grain in the rear hopper. This block prevents the grain from discharging through the said opening, and the fertilizer is dropped just slightly in advance of the grain, yet close to the grain, to nourish it without destroying its germ. By removing the block and closing the forward opening the grain will be planted thick, and when it is desired to plant two kinds of grain alternately—as peas and corn—the corn is placed in one hopper and the peas in the other hopper, and the end openings in the seed-slide are left open while the middle opening is closed. The quantity of grain planted in a hill can be regulated by varying the size of the openings in the seed-slide, which is done by the graduated rings $m$. (Shown in Fig. 7.) These rings are of a uniform diameter from outside to outside, but have various-sized openings. To plant much grain, a ring having a large opening is adjusted to the slide. To plant little grain, a ring having a small opening is placed in position, &c.

When it is desired to plant cotton, the seed-slide is removed and the blocks G and G' taken out, and the agitators are connected with the lever I in the manner already described, the seed being forced out through the slot $f^2$ in the bottom of the hopper. The width of the slot is adjusted by the cut-off plates or slides N, which are held between the beam and the bottom of the hopper, and are held in an adjusted position by the set-screws $n'$, which pass through the slots $n$ in the said cut-off slides. These slides N are carried by the machine at all times; but when the blocks G G' are in use they are adjusted outward, so as not to project into the slot in the bottom of the hopper.

The covering-bar O is supported by the spring-bars $o$, and when it is preferred to use this device the coverers E are detached and replaced by the spring-bars $o$, which are attached to the beam by the bolt $d$.

The hopper, the chutes, and the seed-slide-operating devices can be readily removed when it is desired to use the implement for cultivating solely, it being understood that the covering-shovels will be replaced by cultivator-blades.

Having described my invention, I claim—

1. The combination, with the beam and the opening and covering plows connected to the sides of the beam by a single bolt, of the brace for the opening-plow, and the cross-bar having a series of openings at each end, and the clips adjustably connecting the rear ends of the covering-plows with the said cross-bar, substantially as described.

2. The herein-described planter, composed of the longitudinal beam having an opening at its front end and a slot near its rear end, the drive-wheel mounted in bearings in a vertical bracket and extending into the said front opening, the crank, the vertical lever I, connected with the crank, the opening-plow, and the coverers connected with the beam at their upper ends by a single bolt, the said plow and coverers being suitably braced, the double hopper, the bottom of the hopper having end and middle discharge-openings, the seed-slide having corresponding discharge-openings and operated from the said lever I, and the block attached to the wall separating the hopper and extending over the middle opening, substantially as described, for the purpose specified.

3. The combination, with the hopper having its bottom extended beyond its ends, provided with discharge-openings at points beyond its ends, and with the intermediate longitudinal slot or opening, of the removable blocks fitted in said slot or opening, the oscillating stirrers in the hopper, the reciprocating removable seed-slide bearing on the blocks and guided through the ends of the hopper, the lever I, and connections between the same and the stirrers and seed-slide, whereby said stirrers and slide are operated simultaneously, substantially as described.

4. The combination, in a planter, of the beam having the vertical longitudinal slot, the cut-off slides N, arranged in horizontal openings communicating with the slot, and provided with the transverse slots $n$, the set-screws $n'$, mounted in said slots and bearing against the beam, the hopper mounted on the beam, the oscillating agitators or stirrers in the hopper, and the lever I, connected to the said stirrers and to the slide, substantially as described.

5. The combination, with the hopper, of the agitator-shaft H, journaled in the sides of the hopper and provided with the vertical lever H', having the agitator-fingers $h$ at its lower end below the agitator-shaft, and the agitator-bar K, arranged transversely in the hopper above and parallel with the agitator-shaft, and mechanism for operating the agitators, as set forth.

6. The combination of the beam having a longitudinal slot, the hopper resting on the beam and having a slot in its bottom aligning with the slot in the beam, the slides N, inserted horizontally between the beam and the bottom of the hopper and provided with slots $n$, and the set-screws $n'$, inserted obliquely through said slots and having their ends bearing against the sides of the beam, as set forth.

7. The combination, with the double hopper having a slot in its bottom and having the ends of its bottom extended and provided with discharge-openings, of the two aligned blocks fitted in the said slot, one of said blocks having a discharge-opening, the seed-slide working on the bottom of the hopper and holding the said blocks in place, mechanism for operating the seed-slide, the chute $K'$, arranged under the rear end of the hopper, and the double chute L, arranged under the front end of the hopper, as specified.

In testimony that I claim the foregoing as my own I have hereto affixed my signature in presence of two witnesses.

WILLIAM CAPERS McTYEIRE.

Witnesses:
J. M. BISHOP,
D. D. CHADWICK.